(12) United States Patent
Videcoq

(10) Patent No.: US 7,191,030 B2
(45) Date of Patent: Mar. 13, 2007

(54) METHOD FOR ESTIMATING THE ANGULAR OFFSET, METHOD FOR CALIBRATING A GRINDING MACHINE FOR OPTHALMIC GLASSES AND DEVICE FOR CARRYING OUT SAID CALIBRATING METHOD

(75) Inventor: Jean-Jacques Videcoq, Pavilly (FR)

(73) Assignee: Briot International, Pont de l'Arche (FR)

( * ) Notice: Subject to any disclaimer, the term of this patent is extended or adjusted under 35 U.S.C. 154(b) by 0 days.

(21) Appl. No.: 10/548,466

(22) PCT Filed: Dec. 30, 2003

(86) PCT No.: PCT/FR03/03945

§ 371 (c)(1),
(2), (4) Date: Sep. 12, 2005

(87) PCT Pub. No.: WO2004/082889

PCT Pub. Date: Sep. 30, 2004

(65) Prior Publication Data

US 2006/0217832 A1    Sep. 28, 2006

(30) Foreign Application Priority Data

Mar. 14, 2003  (FR) .................................. 03 03191

(51) Int. Cl.
*G06F 19/00* (2006.01)
*B24B 1/00* (2006.01)

(52) U.S. Cl. ........................... 700/164; 700/159; 451/5

(58) Field of Classification Search ................ 700/160, 700/164, 159, 190–195, 173–176; 451/5, 451/6, 41–44; 351/177

See application file for complete search history.

(56) References Cited

U.S. PATENT DOCUMENTS

| 6,332,827 | B1 | 12/2001 | Gottschald et al. |
| 6,722,944 | B2 * | 4/2004 | Akiyama et al. .............. 451/5 |
| 6,813,536 | B1 * | 11/2004 | Gottschald .................. 700/160 |

FOREIGN PATENT DOCUMENTS

FR           2 771 665        6/1999

* cited by examiner

*Primary Examiner*—Kidest Bahta
(74) *Attorney, Agent, or Firm*—Wenderoth, Lind & Ponack, L.L.P.

(57) ABSTRACT

The invention relates to a method for estimating the angular offset between a rotating radial axis linked to a glass which is to be ground and a reference rotating radial axis which can be applied to a grinding machine for ophthalmic glasses. Said method comprises the following steps: a glass-calibrator is ground, whereby a radial axis linked to the glass is previously made by tracing according to a control rule corresponding to the form of the theoretical finished glass-calibrator whereby the theoretical inclination thereof is known for a reference part of the contour thereof in relation to said radial reference axis; said image (31AI, YI) is analyzed in order to measure the real inclination (I) of the image (33AI) of the reference part (33A) in relation to the image (YI) of the pattern; the angular offset is calculated. The invention also relates to the use of said estimation method in order to calibrate the grinder. and to a device for carrying out said calibration method.

20 Claims, 4 Drawing Sheets

METHOD FOR ESTIMATING THE ANGULAR OFFSET, METHOD FOR CALIBRATING A GRINDING MACHINE FOR OPTHALMIC GLASSES AND DEVICE FOR CARRYING OUT SAID CALIBRATING METHOD

The present invention relates to a method for estimating, for an ophthalmic lens grinding machine, the angular offset between a rotating radial axis associated with a lens that is to be ground and a reference rotating radial axis.

FIG. 1 schematically depicts an ophthalmic lens grinding machine 1, of known type, which essentially comprises a set of grinding wheels 3, a support shaft 5 on which a lens 7 for grinding is mounted, means 9 for driving the shaft 5, and a unit 11 for controlling the drive means 9.

The grinding wheels 3 are mounted to rotate on a bed (not depicted) of the grinding machine 1, about a grinding axis $X_0$, generally fixed relative to the bed. During a grinding operation, the grinding wheels 3 are driven in rotation by motor means which have not been depicted in the figure.

The shaft 5 is generally made up of two coaxial half-shafts 5A, 5B between which the ophthalmic lens 7 is clamped. Conventionally, a grinding adapter 15 (FIG. 2) is fixed, for example by bonding, onto one of the sides of the lens 7, and fitted onto one, 5A, of the half-shafts. For this purpose, the half-shaft 5A has, at its end facing toward the other half-shaft 5B, a driving shape that complements the adapter 15 (FIG. 2). Thus, the lens 7 is secured to the shaft 5 so that the grinding operating can be carried out.

The shaft 5 is mounted to rotate on a carriage (not depicted) able to move relative to the bed of the grinding machine 1. The axis X of the shaft 5, which constitutes its axis of rotation, runs parallel to the grinding axis $X_0$.

The drive means 9 are designed to, on the one hand, rotationally drive the shaft 5 about its axis X and, on the other hand, drive the carriage so as to move the axis XX relative to the grinding $X_0$, according to a datum C delivered by the control unit 11.

To simplify the following description, the drive means 9, designed to rotationally drive the shaft 5 and to move this shaft 5 relative to the grinding wheel 3, or be likened to a single motor. In practice, this motor 9 could be replaced by two separate motors, controlled in a connected way by the control unit 11, one rotationally driving the shaft 5 and the other moving the carriage relative to the grinding wheel 3.

In order to perform an operation of grinding an optical blank 7 that is intended to lead to the obtaining of a finished lens shape 17 (depicted in dotted line in FIG. 1), the control unit 11 is programmed in such a way as to control the drive means 9 according to a control law associated with the shape 17. This control law connects a parameter of distance between the axis X and the grinding wheel, with a parameter of angular position of the blank or lens about its axis X. It may be expressed in the form of:

$$r=f(\theta)$$

where r is the inter-axis distance between the axes X and $X_0$, and $\theta$ is supposed to represent the angular position of the blank or lens about the axis X relative to a neutral position defined by a radial axis that is fixed relative to the carriage, that is to say relative to the axis X.

FIG. 2 depicts the ophthalmic blank 7 equipped with the adapter 15, the blank and the adapter together forming a one-piece assembly ready to be mounted on the half-shaft 5A by fitting.

The adapter 15 has a base 21 in the form of a flange bonded to the optical blank 7, and a more or less cylindrical boss 23 projecting from said base 21. The adapter 15 also comprises an error-proofing feature 25 projecting radially from the boss, allowing the optical blank 7 to be mounted on the shaft 5 in a predetermined orientation defined by the radial axis Y passing through the center of rotation O. When the adapter 15 is mounted on the shaft 5, the axis X of the shaft 5 passes through the center O of the adapter 15 and defines with the radial axis Y a rotating frame of reference connected with the blank or lens 7 which is to be ground. In what follows, the axis X will be termed "rotating radial axis connected with the blank or lens that is to be ground".

This rotating radial axis Y coincides, when the blank or lens 7 is mounted on the shaft 5, with a corresponding rotating radial axis of the driving shape of the half-shaft 5A.

As seen earlier, the control of the drive means 9 by the control unit 11 entails knowledge, at every moment, of the angular position of the axis Y with respect to the radial axis fixed in terms of rotation about the axis X.

The angle $\theta$ involved in the control law of the aforementioned type in actual fact represents the angular position of a reference rotating radial axis Y', known through the construction of the machine, with respect to this fixed radial axis.

The grinding machine 1 is in theory designed so that the reference radial axis Y' coincides with the radial axis connected with the driving shape of the half-shaft 5A, that is to say with the radial axis Y connected with the blank or lens.

In practice, however, the precision with which the axis Y' is superimposed on the axis Y is of the order of one degree, whereas the required precision on the angle $\theta$ in order to obtain finished lenses of satisfactory quality is of the order of one tenth of a degree.

In the case of present-day grinding machines, it is therefore necessary, prior to the first use of the machine, to estimate the angular offset $\delta$ of the radial axis connected with the blank or lens Y with respect to the reference radial axis Y', and to calibrate the machine in such a way as to introduce, into the control unit 11, a correction to the control law. This correction is manifested in a change in angular-position variable, from $\theta$ to $\theta+\delta$, so that the control command after calibration is expressed in the form:

$$r=f(\theta+\delta).$$

The state of the art knows a method allowing the angular offset $\delta$ to be estimated and the grinding machine thus calibrated.

Such a method will now be described with reference to FIGS. 3 to 5 which illustrate, in plan views, reference standard lenses equipped with their adapter.

The operator places a first optical blank 31, already fitted with an adapter 15 and already marked (by printing with ink or engraving) with the radial axis Y defining the orientation of the adapter, into the grinding machine 1.

This marking defines a line of a radial axis connected with the blank or lens. In this instance, this axis associated with the blank or lens is coincident with the axis of the adapter, but the adapter could be placed on the blank with a known non-zero offset with respect to the axis marked on the blank. This known additional offset would then be taken into consideration in the correction applied to the control law.

The operator then runs the grinding machine 1 according to a particular control law programmed into the control unit 11 and in theory, that is to say when there is no angular offset $\delta$, leading to the theoretical finished shape 31T depicted in chain line in FIG. 3.

The shape of lens 31T thus obtained has, in the example depicted, a straight edge 33 parallel to the axis Y. This straight edge 33 defines a reference part of the contour, the theoretical inclination of which is zero.

It goes without saying that the theoretical shape 31T could be of some other type, the necessary condition being that a reference part of the contour, straight or otherwise, be identified and of known inclination. If the reference part is not straight, its inclination is defined as the inclination of its tangent at a reference point, particularly a mid-point of the reference part. Obviously, a straight edge offers greater simplicity in measuring the inclination. This is why the invention is described using a reference standard lens the theoretical shape of which comprises a straight edge. As a choice for greater simplicity, the theoretical inclination of the reference straight edge, is, in addition, chosen to be zero. In this case, when there is no offset δ, the axes Y and Y' are coincident.

When there is an offset δ, the operator in actual fact obtains a first finished reference standard lens 31A depicted in FIG. 4.

The operator then repeats the operation using a second blank 31, having reprogrammed the control unit 11 with a control law leading to the obtaining of a second finished lens symmetric with the first. Theoretically again, if there is no angular offset δ, the shape of the second lens would exhibit a straight edge 33 parallel to the axis Y.

The existence of the angular offset δ between the radial axis connected with the blank or lens Y and the reference radial axis Y' of the machine leads to a lack of parallelism between each of the straight edges 33A, 33B and their respective radial axis Y.

As illustrated in FIG. 5, the operator then superposes the two finished lenses 31A, 31B. An offset angle Δ equal to twice the offset angle δ:

$$\Delta = 2 \times \delta$$

then appears between the two radial axes Y.

To measure the angle Δ and thus gain access to the angular offset δ, the operator may, for example, place the two superposed lenses 31A, 31B on a graduated table, and thus view the angle formed by the two axes marked Y.

Such a method has a certain number of disadvantages, particularly the fact that it forces the operator to grind two reference standard lenses in two successive operations, thus incurring a loss of time and of ophthalmic hardware. In addition, the phase of measuring the two symmetric lenses after grinding is a manual operation that requires a certain amount of skill on the part of the operator and does not always lead to sufficient measurement precision.

It is an object of the invention to propose a method for estimating the angular offset in an optical lens grinding machine of the type described earlier that makes it possible to obtain better precision, and uses a lower number of grinding operations and simple handling operations.

This object is achieved through an estimating method according to the invention, in which:
- a reference standard lens is ground, on which reference standard lens the radial axis associated with the lens has already been embodied in the form of a line, according to a control law corresponding to a theoretical finished shape of reference standard lens, of which the theoretical inclination of a reference part of the contour with respect to said reference radial axis is known;
- an image of the finished reference standard lens and of said line is produced;
- said image is analyzed using image-analysis means, so as to measure the actual inclination of the image of the reference part with respect to the image of the line; and
- said angular offset which is equal to the discrepancy between the measured actual inclination and the theoretical inclination is deduced.

According to other features of the method:
- the reference standard lens is chosen so that its contour has at least one straight edge, the latter constituting the reference part of the contour;
- the reference standard lens is chosen so that said straight edge of its theoretical finished shape is parallel to the reference radial axis, that is to say has zero theoretical inclination;
- the line consists of a mark transferred onto the lens to coincide with the radial axis of the grinding adapter; and
- an image of the reference standard lens and of the line is produced in the following way:
- a shadow of the reference standard lens and of the line is projected onto a screen; and
- this shadow is observed using a video camera.

The invention is also aimed at a method of calibrating an ophthalmic lens grinding machine of the aforementioned type, in which the angular offset between a rotating radial axis connected with a blank or lens that is to be ground and a reference rotating radial axis is estimated using a method as described hereinabove, and in which the control means are programmed in such a way as to introduce a correction into the control laws that is dependent on said estimated angular offset.

As a preference, said correction consists in increasing, in the control law, the angular position variable by the algebraic magnitude of the estimated angular offset.

The invention finally is aimed at a device for implementing a calibration method as described hereinabove, this device comprising:
- an image-capturing device;
- image analysis means connected to said image-capturing device, designed to measure the actual inclination of the image of a reference part of the contour of an ophthalmic object with respect to the image of a line featured on said ophthalmic object;
- programming means connected on the one hand to the image analysis means and, on the other hand, to the control means of an ophthalmic lens grinding machine, said programming means being designed to receive an angular offset information item from the image analysis means and in response to program the control means of the grinding machine in such a way as to introduce a correction into the control laws as a function of said angular offset information item.

According to other features of the device according to the invention:
- the device further comprises a screen and means of illuminating an ophthalmic object allowing the shadow of the object to be projected onto the screen, said screen being placed in the field of view of said image-capture device;
- the device comprises a transparent support for accepting the ophthalmic object, arranged between the illumination means and the screen;
- the device comprises a collimator arranged between the illumination means and the transparent support in order to make the light rays emanating from the illumination means more or less mutually parallel and normal to the support;
- the screen is a frosted glass plate; and
- the image-capturing device is a video camera.

BRIEF DESCRIPTION OF THE DRAWINGS

The invention will now be described in greater detail with reference to the following drawings, in which.

Figure 6:
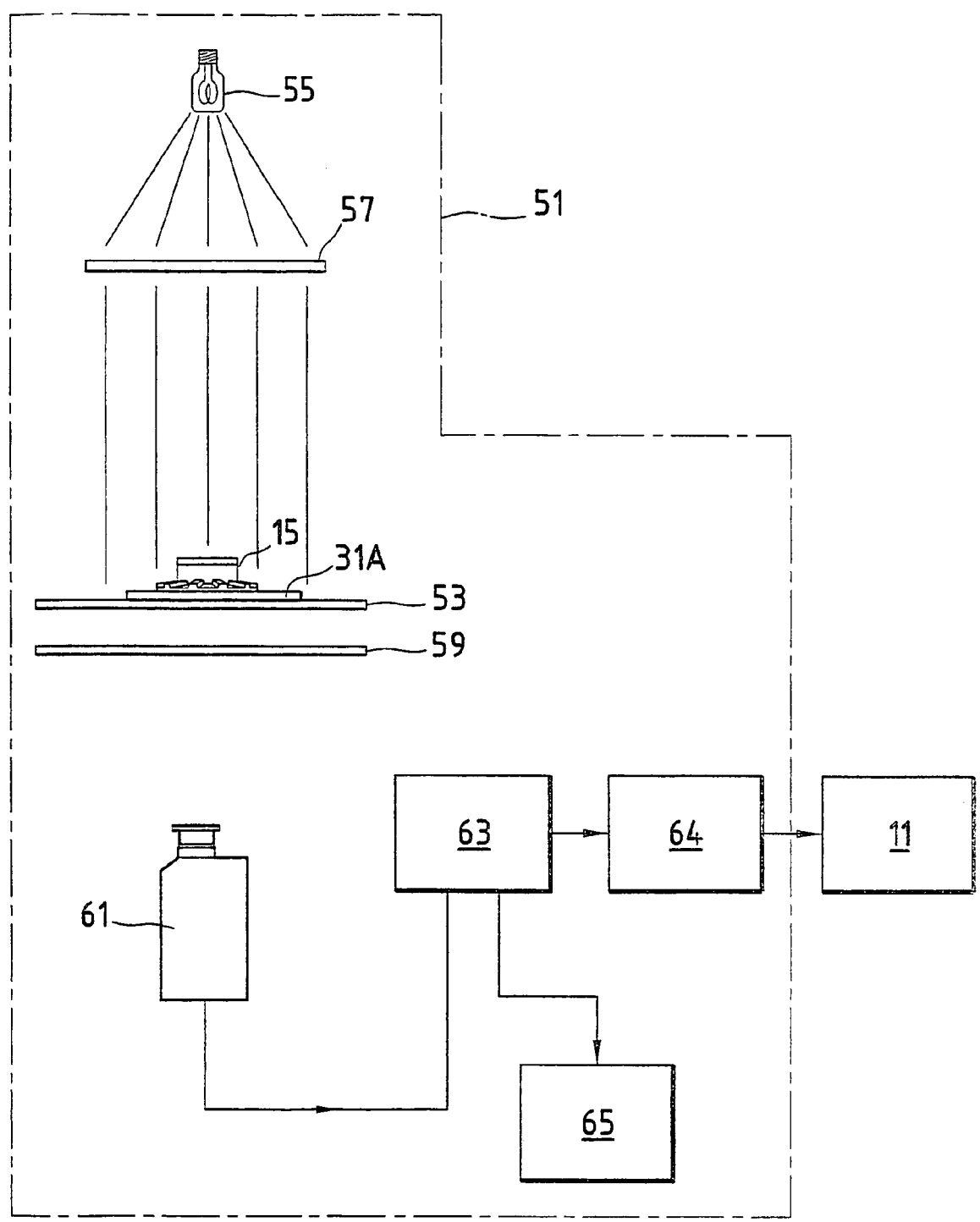
FIG. 6 is a schematic view of device according to the invention.

One particular embodiment of the invention will now be described in greater detail with reference to FIGS. 6 and 7 of the attached drawings, among which:

FIG. 6 is a schematic view of a device according to the invention; and

Figure 7:
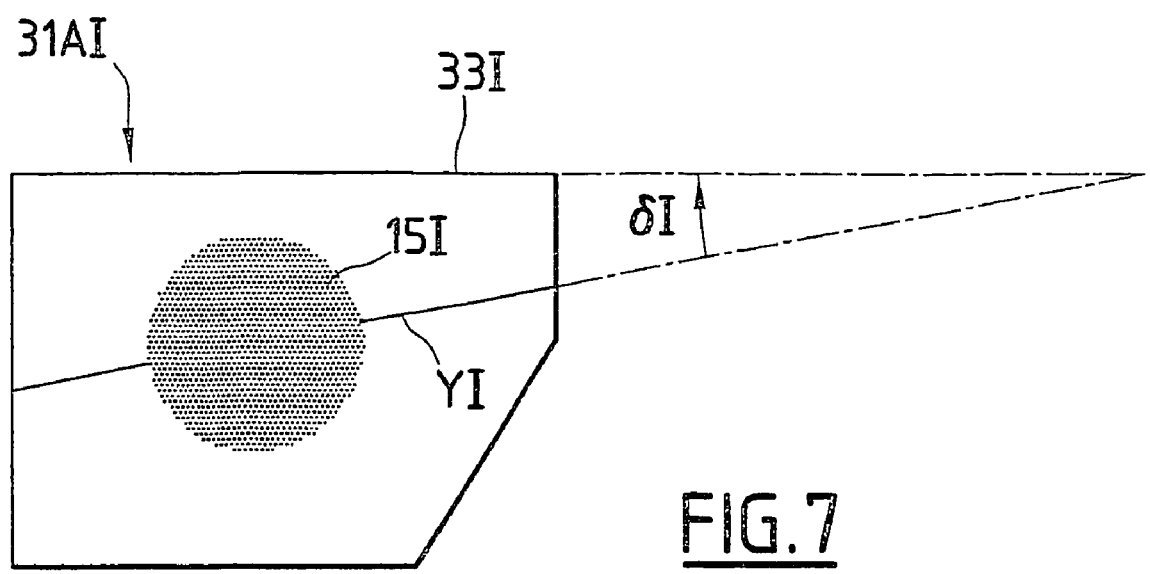
FIG. 7 is a plan view of a reference standard lens as may be seen by the image-capture device of the device according to the invention.

FIG. 7 is a plan view of a reference standard lens as may be seen by the image-capture device of the device according to the invention.

Figure 1:
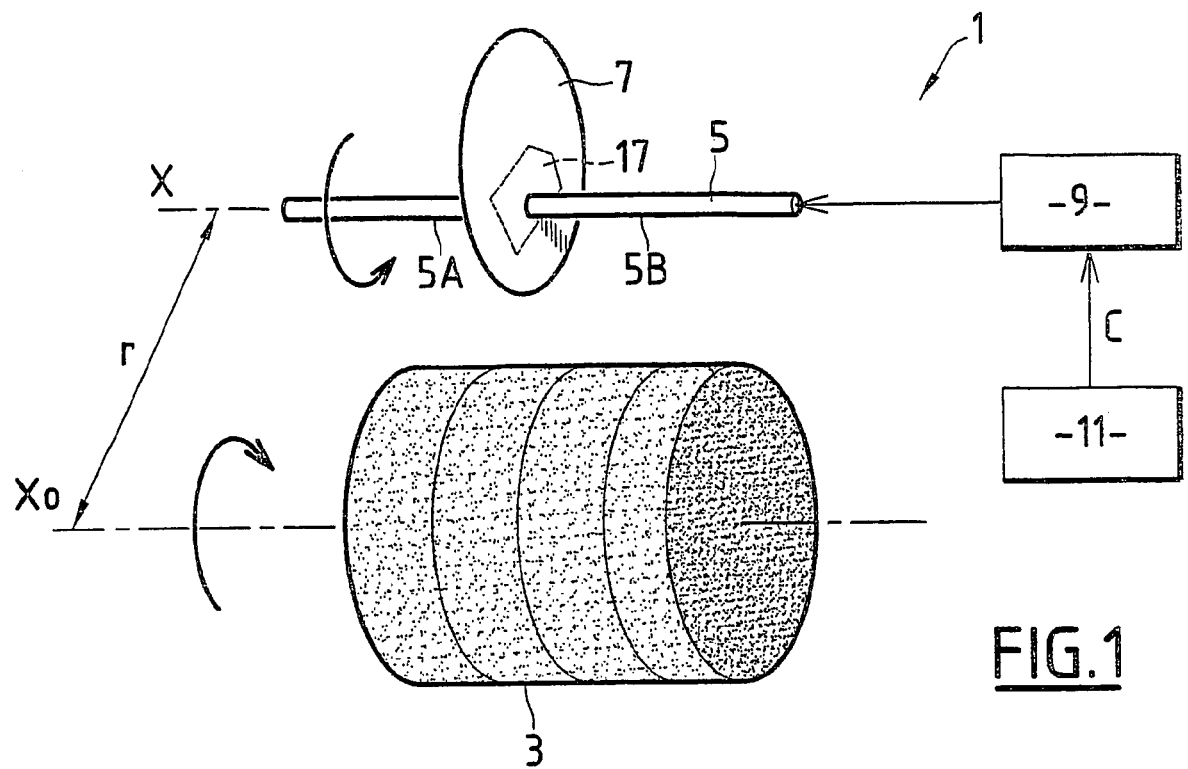
FIG. 1 schematically depicts n optical lens grinding machine of a known type.
Figure 2:
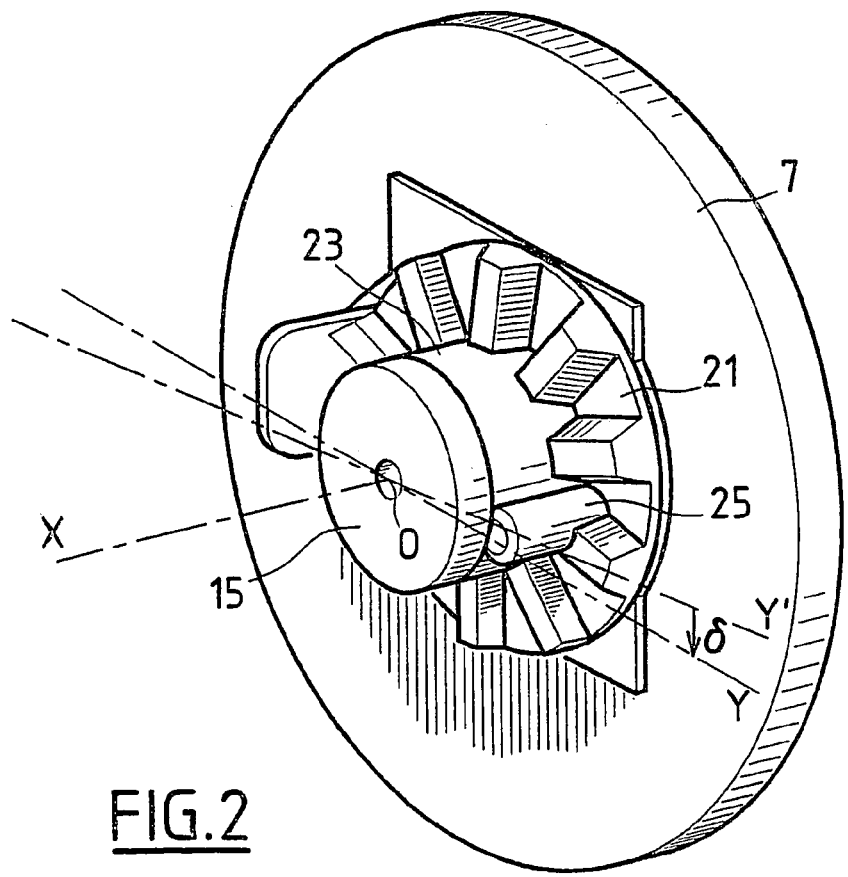
FIG. 2 depicts an ophthalmic blank equipped with an adaptor.
Figure 3:
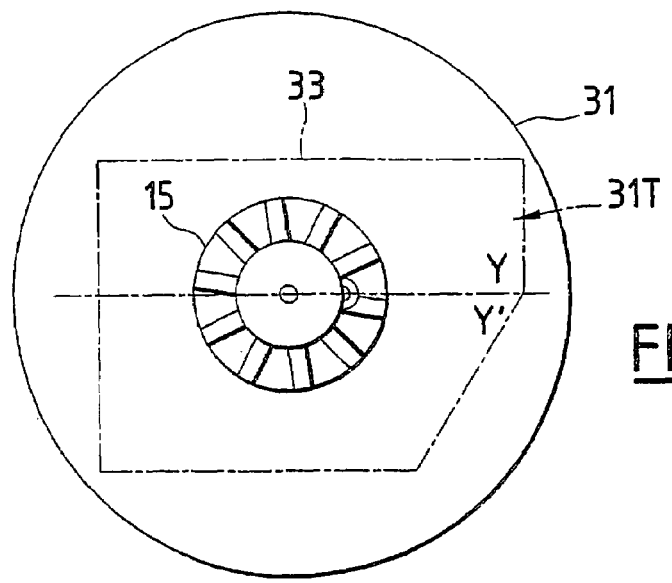
FIGS. 3–5 illustrate, in plan views, reference standard lenses equipped with their adaptor.
Figure 4:
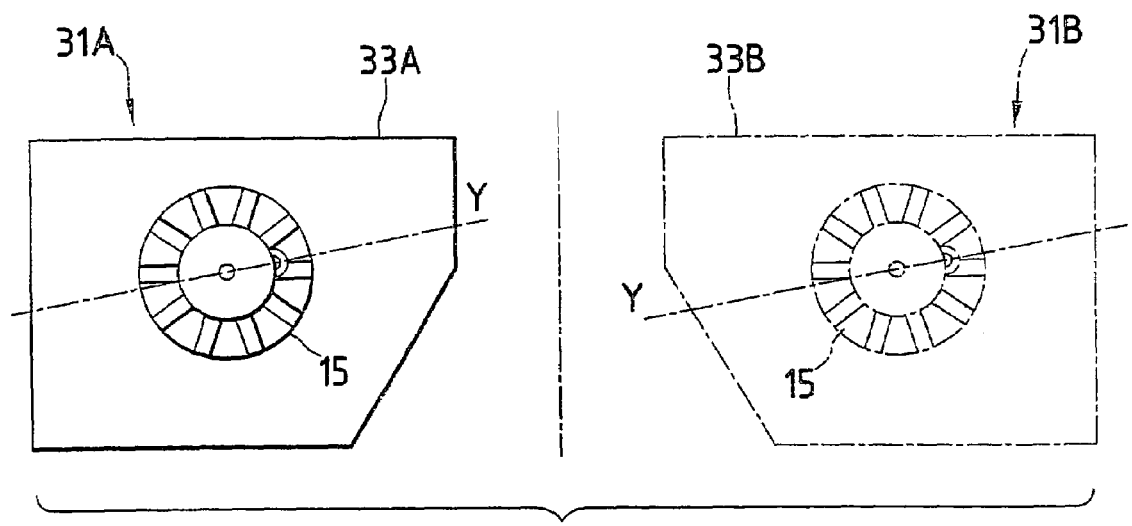
Figure 5:
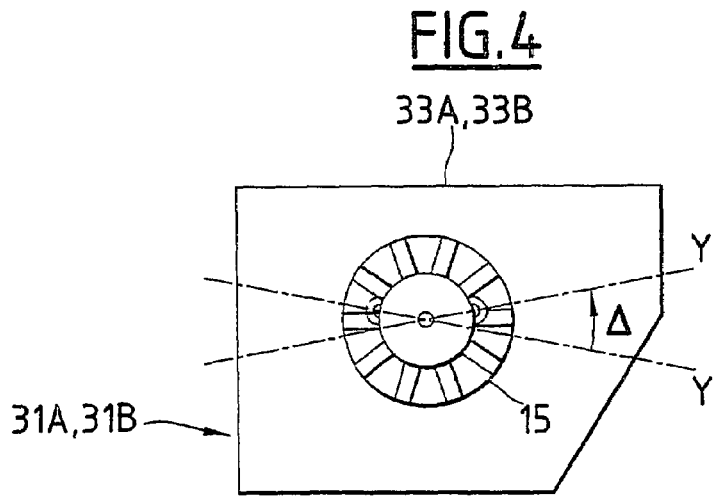

According to the method for estimating the angular offset δ according to the invention, a reference standard lens of the type described with reference to FIG. 4 is ground from a marked blank 31, as described with reference to FIG. 3.

The offset δ is then estimated by the device 51 depicted in FIG. 6.

This device 51 comprises a transparent flat support 53 on which the reference standard lens 31a equipped with its adaptor 15 may be placed.

It also comprises a light source 55, a collimator 57, and a frosted glass plate 59, which are arranged in such a way that the rays of light emanating from the source 55 pass through the collimator 57 to be made parallel and illuminate orthogonally the lens 31A placed on the support 53. This arrangement allows the lens 31A and its adaptor 15 to be projected onto the frosted glass plate 59.

The device additionally comprises an image-capture device in the form of a video camera 61, image analysis means 63 connected to the camera 61, and possibly a display screen 65 connected to the image analysis means 63. The screen 65 could equally be connected directly to the camera 61.

The frosted glass plate 59, which forms the screen onto which the shadow of the object placed on the support 53 is projected, is placed in the field of the camera 61 so that the camera 61 observes this projected shadow and transmits its image to the image analysis means 63.

The device further comprises programming means 64 connected, on the one hand, to the image analysis means 63 and, on the other hand, to the grinding machine control unit 11.

FIG. 7 depicts the image 31AI of the reference standard lens 31A thus observed by the camera 61 and visible on the screen 65.

Directly visible on this image 31AI are the solid shadow of the adaptor 15I, the shadow of the axis marking YI, and the shadow of the straight edge 33I.

The image analysis means 63 are designed to:

detect the image of the straight edge 33I and the image of the adaptor axis YI, and measure the angular offset δ, assumed to be equal to the actual offset δ, between the image of the straight edge 33I and the axis of the adaptor YI.

The estimated value of the offset δ is transmitted to the programming means 64.

Thus, the device 51 makes it possible to make a precise estimate of the offset angle δ after grinding a single reference standard lens, and, by virtue of its programming means 64, allows the ophthalmic lens grinding machine control means 11 to be programmed automatically in such a way as to introduce a correction into the control laws, the correction being dependent on the estimated value of the angular offset δ.

It should be noted that the line embodying the axis connected with the blank or lens Y, that is to say the marking of the axis in the example depicted, could consist of the shape of the adaptor itself, the image analysis means having then to virtually "recreate" the axis of the adaptor Y on the basis of the image of the adaptor, oriented by virtue of the image of the error-proofing feature.

The invention claimed is:

1. A method for estimating, for an ophthalmic lens grinding machine (1), the angular offset (δ) between a rotating radial axis (Y) associated with a lens that is to be ground and a reference rotating radial axis (Y'), said grinding machine (1) comprising:

a grinding wheel (3);

a support shaft (5) that can rotate about its axis (X) and can move with respect to the grinding wheel (3), on which support shaft an ophthalmic lens (7) can be mounted via a grinding adapter (15), such that the lens rotates as one with the shaft, drive means (9) designed to rotationally drive the support shaft (5) about its axis (X) and to move the support shaft (5) with respect to the grinding wheel (3); and control means (11) able to control the drive means (9) according to a preprogrammed control law connecting the relative position (r) of the support shaft (5) and of the grinding wheel (3) to the angular position (θ) of the reference rotating radial axis (Y') in a fixed frame of reference connected with the axis (X) of the support shaft (5);

which method comprises:

grinding a reference standard lens (31A) on which the radial axis (Y) associated with the lens has already been embodied in the form of a line, according to a control law corresponding to a theoretical finished shape of reference standard lens, of which the theoretical inclination of a reference part (33A) of the contour with respect to said reference radial axis (Y') is known;

producing an image (31AI, YI) of the finished reference standard lens and of said line;

analyzing said image (31AI, YI) using image-analysis means, so as to measure the actual inclination (δI) of the image (33AI) of the reference part (33A) with respect to the image (YI) of the line; and deducing said angular offset (δ) which is equal to the discrepancy between the measured actual inclination (δI) and the theoretical inclination.

2. The method as claimed in claim 1, characterized in that the reference standard lens (31A) is chosen so that its contour has at least one straight edge (33A), the latter constituting the reference part of the contour.

3. The method as claimed in claim 2, characterized in that the reference standard lens (31A) is chosen so that said straight edge (33A) of its theoretical finished shape is parallel to the reference radial axis (Y'), that is to say has zero theoretical inclination.

4. The method as claimed in claim 1, characterized in that the line consists of a mark transferred onto the lens (7) to coincide with the radial axis (Y) of the grinding adapter (15).

5. The method as claimed in claim 1, characterized in that an image of the reference standard lens (31A) and of the line (Y) is produced in the following way:
- a shadow of the reference standard lens (31A) and of the line (Y) is projected onto a screen (59); and
- this shadow is observed using a video camera (61).

6. A method of calibrating an ophthalmic lens grinding machine, of the type comprising:
- a grinding wheel (3);
- a support shaft (5) that can rotate about its axis (X) and can move with respect to the grinding wheel (3), on which support shaft an ophthalmic lens (7) can be mounted via a grinding adapter (15), such that the lens rotates as one with the shaft,
- drive means (9) designed to rotationally drive the support shaft (5) about its axis (X) and to move the support shaft (5) with respect to the grinding wheel (3); and
- control means (11) able to control the drive means (9) according to a preprogrammed control law connecting the relative position (r) of the support shaft (5) and of the grinding wheel (3) to the angular position (θ) of a reference rotating radial axis (Y') in a fixed frame of reference connected with the axis (X) of the support shaft (5);

in which the angular offset (δ) between a rotating radial axis (Y) connected with a lens (7) that is to be ground and the reference rotating radial axis (Y') is estimated using a method as claimed in claim 1,
and in which the control means (11) are programmed in such a way as to introduce a correction into the control laws which correction is dependent on said estimated angular offset (δ).

7. The calibration method as claimed in claim 6, characterized in that said correction comprises increasing, in the control law, the angular position variable (θ) by the algebraic magnitude (δ) of the estimated angular offset.

8. A device for implementing a method as claimed in claim 6, comprising:
- an image-capturing device (61);
- image analysis means (63) connected to said image-capturing device (61), designed to measure the actual inclination (δI) of the image (33AI) of a reference part (33A) of the contour of an ophthalmic object (31A) with respect to the image (YI) of a line featured on said ophthalmic object (31A);
- programming means (64) connected on the one hand to the image analysis means (63) and, on the other hand, to the control means (11) of an ophthalmic lens grinding machine (1), said programming means (64) being designed to receive an angular offset information item (δ) from the image analysis means (63) and in response to program the control means (11) of the grinding machine in such a way as to introduce a correction into the control laws as a function of said angular offset information item (δ).

9. The device as claimed in claim 8, characterized in that it further comprises a screen (59) and means (55) of illuminating an ophthalmic object allowing the shadow of the object to be projected onto the screen (59), said screen (59) being placed in the field of view of said image-capture device (61).

10. The device as claimed in claim 9, characterized in that it comprises a transparent support (53) for accepting the ophthalmic object, arranged between the illumination means (55) and the screen (59).

11. The device as claimed in claim 10, characterized in that it comprises a collimator (57) arranged between the illumination means (55) and the transparent support (53) in order to make the light rays emanating from the illumination means (55) more or less mutually parallel and normal to the support (53).

12. The device as claimed in claim 9, characterized in that the screen (59) is a frosted glass plate.

13. The device as claimed in claim 8, characterized in that the image-capture device (61) is a video camera.

14. The method as claimed in claim 2, characterized in that the line consists of a mark transferred onto the lens (7) to coincide with the radial axis (Y) of the grinding adapter (15).

15. The method as claimed in claim 3, characterized in that the line consists of a mark transferred onto the lens (7) to coincide with the radial axis (Y) of the grinding adapter (15).

16. The method as claimed in claim 2, characterized in that an image of the reference standard lens (31A) and of the line (Y) is produced in the following way:
- a shadow of the reference standard lens (31A) and of the line (Y) is projected onto a screen (59); and
- this shadow is observed using a video camera (61).

17. The method as claimed in claim 3, characterized in that an image of the reference standard lens (31A) and of the line (Y) is produced in the following way:
- a shadow of the reference standard lens (31A) and of the line (Y) is projected onto a screen (59); and
- this shadow is observed using a video camera (61).

18. The method as claimed in claim 4, characterized in that an image of the reference standard lens (31A) and of the line (Y) is produced in the following way:
- a shadow of the reference standard lens (31A) and of the line (Y) is projected onto a screen (59); and
- this shadow is observed using a video camera (61).

19. The method as claimed in claim 14, characterized in that an image of the reference standard lens (31A) and of the line (Y) is produced in the following way:
- a shadow of the reference standard lens (31A) and of the line (Y) is projected onto a screen (59); and
- this shadow is observed using a video camera (61).

20. The method as claimed in claim 15, characterized in that an image of the reference standard lens (31A) and of the line (Y) is produced in the following way:
- a shadow of the reference standard lens (31A) and of the line (Y) is projected onto a screen (59); and
- this shadow is observed using a video camera (61).

* * * * *